United States Patent [19]

Farr

[11] Patent Number: 5,372,409
[45] Date of Patent: Dec. 13, 1994

[54] FLUID-PRESSURE OPERATED BOOSTERS FOR VEHICLE BRAKING SYSTEMS

[75] Inventor: Glyn P. R. Farr, Warwickshire, England

[73] Assignee: Lucas Industries Public Limited Company, Birmingham, England

[21] Appl. No.: 99,804

[22] Filed: Jul. 30, 1993

Related U.S. Application Data

[63] Continuation of Ser. No. 857,681, Mar. 25, 1992, abandoned, which is a continuation of Ser. No. 466,579, Jan. 17, 1990, abandoned.

[30] Foreign Application Priority Data

| | | | |
|---|---|---|---|
| Jan. 18, 1989 | [GB] | United Kingdom | 8901066 |
| Apr. 13, 1989 | [GB] | United Kingdom | 8908337 |
| Aug. 9, 1989 | [GB] | United Kingdom | 8918159 |

[51] Int. Cl.$^5$ ............................................ B60T 13/44
[52] U.S. Cl. ............................................ 303/20; 303/12; 303/114.3
[58] Field of Search .............. 303/10, 12, 20, 113.3, 303/114.3; 188/356, 357

[56] References Cited

U.S. PATENT DOCUMENTS

| | | | |
|---|---|---|---|
| 3,556,608 | 1/1971 | MacDuff et al. | 303/114 PN |
| 3,972,382 | 8/1976 | Takayama et al. | 303/114 X |
| 4,057,301 | 11/1977 | Foster | 303/114 R |
| 4,512,615 | 4/1985 | Kita et al. | 303/114 X |
| 4,547,022 | 10/1985 | Brearley et al. | 303/115 X |
| 4,681,196 | 7/1987 | Fulmer et al. | 303/100 X |
| 4,778,225 | 10/1988 | Rudolph et al. | 303/113 TB |
| 4,848,848 | 7/1989 | Klein | 303/114 X |
| 4,875,750 | 10/1989 | Takayama | 188/356 X |

FOREIGN PATENT DOCUMENTS

| | | | |
|---|---|---|---|
| 238388 | 9/1987 | European Pat. Off. | 303/114 |
| 3640793 | 6/1988 | Germany. | |
| 1283438 | 7/1972 | United Kingdom | 303/114 |
| 2219368 | 12/1989 | United Kingdom | 303/114 PN |

Primary Examiner—Robert J. Oberleitner
Assistant Examiner—Alfred Muratori
Attorney, Agent, or Firm—Laff, Whitesel, Conte & Saret, Ltd.

[57] ABSTRACT

Energization of a fluid-pressure operated booster is controlled solely by operation of a solenoid-operated valve device, suitably first and second solenoid-operated valves, responsive to signals from an electronic controller. The construction of the booster is therefore modified in comparison with known boosters by the omission of the conventional mechanical valve adapted to be operated by the pedal for normal operation of the booster.

8 Claims, 6 Drawing Sheets

FLUID-PRESSURE OPERATED BOOSTERS FOR VEHICLE BRAKING SYSTEMS

This application is a continuation of application Ser. No. 07/857,681, filed Mar. 25, 1992, now abandoned which is a continuation of Ser. No. 07/466,579, filed Jan. 17, 1990, now abandoned.

BACKGROUND TO THE INVENTION

This invention relates to fluid-pressure operated boosters for vehicle braking systems.

Known boosters for vehicle braking systems include a movable wall which applies a force to an output member, and the force exerted by the movable wall is augmented by fluid-pressure applied to the wall under the control of a mechanical valve operated by a pedal to energize the booster.

When the booster is pneumatically operated, chambers an opposite sides of the wall are normally subjected to equal fluid pressures, for example vacuum, through the open valve. Operation of the pedal first closes the valve to isolate the chambers from each other, and then operates the valve to admit fluid at a different pressure, suitably atmospheric air into one of the chambers, whereby to energize the booster by subjecting the movable wall to a differential pressure which augments the brake-applying force from the pedal.

When the booster is hydraulically-operated operation of the valve, suitably a spool valve, by the pedal causes hydraulic fluid under pressure, suitably from an hydraulic accumulator, to be admitted into a boost chamber, whereby to act on a boost piston, which comprises the movable wall, and energize the booster by pressurising the boost chamber.

It is known from EP-A-0 267 018 to control the operation of such known boosters independently of the pedal by the use of solenoid-operated valve means which are responsive to signals sensed by wheel speed sensors. This enables the brakes to be applied independently of the pedal to achieve traction control of a vehicle by applying the brake on a spinning wheel.

SUMMARY OF THE INVENTION

According to our invention, energization of a booster is controlled solely by operation of solenoid-operated valve means responsive to signals from an electronic controller.

The construction of the booster is therefore modified in comparison with known boosters by the omission of the conventional mechanical valve adapted to be operated by the pedal for normal operation of the booster.

The electronic controller receives signals from wheel speed sensors sensing the behaviour of the wheels and signals generated by operation of electrical means responsive to operation of the pedal, suitably an electrical switch, or a load cell.

Thus normal operation of the booster is initiated by pedal operation of the electrical means with the controller operating the solenoid-operated valve means to achieve conventional operation of the booster.

Should, for example, a wheel speed sensor emit a signal indicative of a 'wheel-spin' condition then, in a normal inoperative position of the pedal, the controller operates the solenoid-operated valve means independently of the pedal to apply the brake on the spinning wheel.

The booster may be incorporated in an hydraulic braking system in which the pressure of fluid supplied to a wheel brake from a master cylinder operated by the booster is adapted to be modulated by a modulator in response to a signal from the electronic controller which, in turn, is initiated by a signal from the wheel speed sensor for the wheel operated by that brake. In such a system, should difficulty arise in controlling the solenoid-operated valve means sufficiently precisely for a smooth operation of the brake to be achieved for normal brake operation, then a given pressure generated by the master cylinder can be modified by the modulator in response to signals from the controller to achieve an appropriate brake-applying pressure.

In such a system the controller looks at pulses indicative of the approach of a critical rate of booster output and above which normal smooth operation of the brake is difficult to achieve, and the controller then actuates the modulator to control smoothly the subsequent rate of pressure increase applied to the brake.

In this mode of operation the master cylinder acts as a hydraulic accumulator having a range of progressively increasing stepped output pressures, and the modulator is adapted to determine the actual pressure which is applied to the brake by modifying the output from the accumulator, at least up to the maximum of a given step.

The booster can also be controlled in response to a wheel anti-lock signal to reduce the level of applied pressure, and to conserve the power source, particularly when vacuum is the medium.

In addition the booster can be operated to apply the brakes when the vehicle is on a collision course and the driver does not take the necessary action. In such a situation the controller receives a radar signal from a radar transmitter on the vehicle.

The booster may be adapted to modify its boost ratio to provide substantially the same vehicle deceleration for a given predetermined pedal effort irrespective of the vehicle's laden condition.

Finally the booster can be operated to apply the brakes in order to hold the vehicle on a hill or incline with the clutch pedal depressed. The controller automatically operates the solenoid-operated valve means to apply the brakes.

Preferably the solenoid-operated valve means comprises first and second independently operable solenoid-operated valves which can be operated by the controller in any desired sequence in accordance with at least one parameter obtaining at any given time, for example a pedal-generated electrical signal, a wheel spin signal, a wheel anti-lock signal, a remote radar signal, or a signal from a 'hill-holder'.

BRIEF DESCRIPTION OF THE DRAWINGS

Some embodiments of our invention are illustrated in the accompanying drawings in which.

DETAILED DESCRIPTION OF THE PREFERRED EMBODIMENTS

Figure 1:
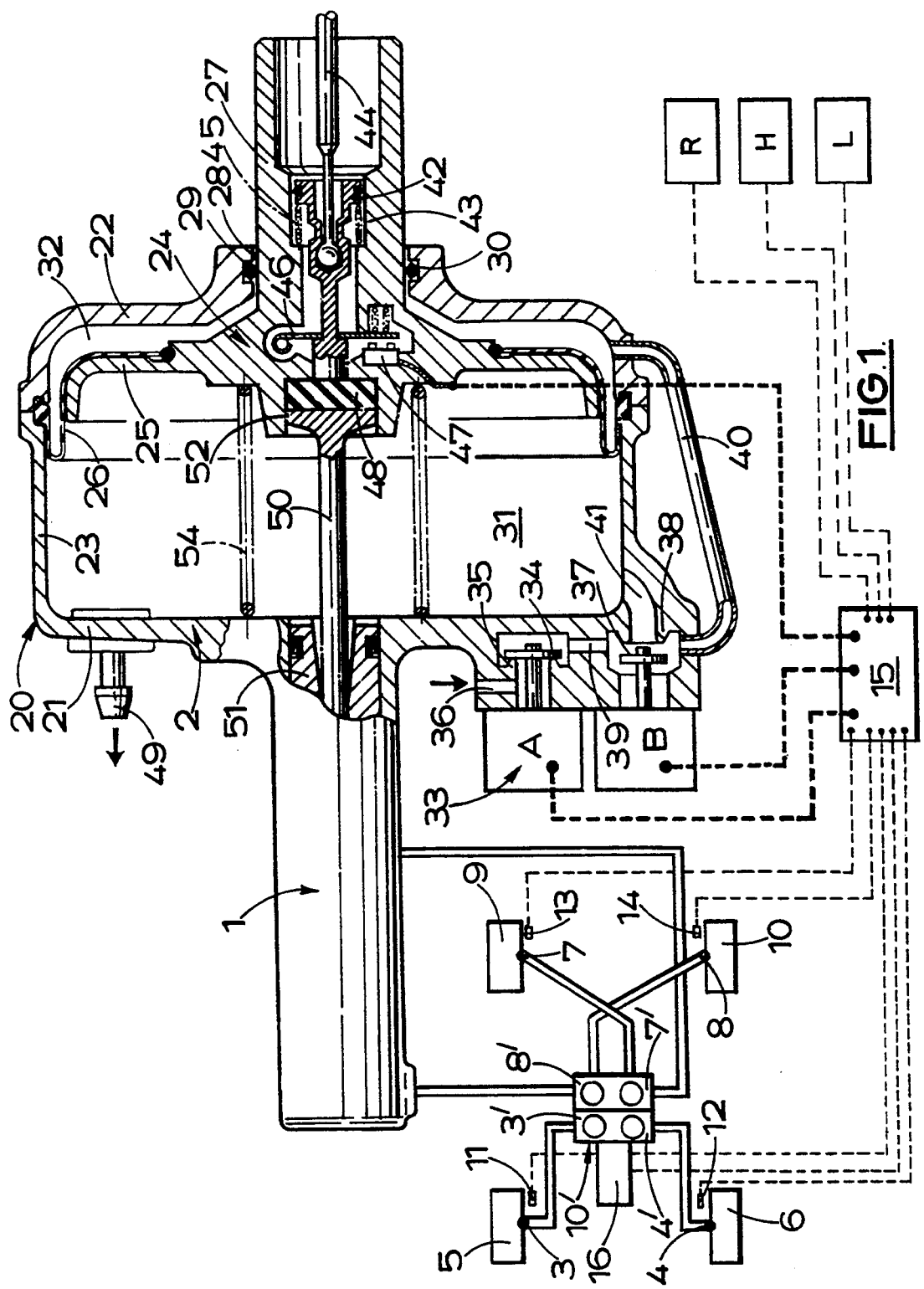
FIG. 1 is a layout of a hydraulic braking system for a vehicle including a vacuum-suspended booster.

In the hydraulic braking system illustrated in FIG. 1 of the accompanying drawings a tandem hydraulic master cylinder 1 is adapted to be operated by a vacuum-suspended booster 2 in order to apply brakes 3,4 on front wheels 5,6 of a vehicle and brakes 7,8 on rear wheels 9,10 of the vehicle. Specifically the front wheel brake 3 and the diagonally opposite rear wheel brake 8 are applied from a primary pressure space of the master cylinder 1 through an anti-lock modulator assembly 10, and the front wheel brake 4 and the brake 7 on the diagonally opposite rear wheel are applied from the secondary pressure space through the modulator assembly 10. The modulator assembly comprises a separate modulator 3',4',7' and 8' for each respective brake 3,4,7 and 8.

The speed of each wheel is sensed by a respective speed sensor 11,12,13 and 14 from which signals are sent to an electronic controller in the form of a control modulator 15.

An hydraulic brake re-application pump associated with the modulator assembly 10 is driven by an electric motor 16 in response to an electric current emitted by the control module 15.

The vacuum-suspended booster 2 comprises a hollow housing 20 which is integral at its forward end with the master cylinder 1. The housing 20 has opposed end walls 21 and 22 at opposite ends of a cylindrical body wall 23. A piston 24 of stepped outline has a portion 25 of larger diameter and a portion 27 of smaller diameter. The portion 25 is connected at its outer edge to the body wall 23 by means of a rolling diaphragm 26 with which it defines a movable wall, and the portion 27 defines a hollow extension which extends rearwardly and projects outwardly through an opening 28 in the end wall 22. The extension 27 has a sliding sealing engagement in a seal 29 housed in a radial groove 30 in a wall defining the opening 28.

A constant pressure chamber 31 in the housing 20 between the piston 24 and the end wall 21 is normally subjected to a source of vacuum, suitable the inlet manifold of the vehicle, through a connection 49 passing through the wall 21. A servo or energizing pressure chamber 32 in the housing 20 between the piston 24 and the end wall 22 can be connected to the chamber 31, and can be isolated from the chamber 31 and/or connected to atmosphere through solenoid-operated valve means 33.

As illustrated the solenoid-operated valve means 33 comprises a first solenoid-operated inlet valve (A), and a second solenoid-operated isolating valve (B). The valve (A) has a valve head 34 for engagement with a seating 35 to close an inlet passage 36 from atmosphere, and the valve (B) has a valve head 37 which is normally spaced from a seating 38. In this open position the chambers 31 and 32 are in open communication through an external pipe 40 and a passage 41 which leads to the chambers 31 from the seating 38. The two valves (A) and (B) are in permanent communication through a passage 39.

Operation of the booster is initiated by a pedal which acts on a piston 42 working in a bore 43 in the extension 22 through a force input member in the form of a rod 44 to advance the piston 42 against the load in a spring 45. This movement is transmitted through a lever 46 to a dual electric switch 47 which sends signals to the control module 15, and through a reducing mechanism in the form of a block 48 of resilient material 8 to an output member in the form of a rod 50 which, in turn, acts on a primary piston 51 of the master cylinder 1. The reaction block 48 is housed in a recess 52 in the piston 25 with the piston 42 acting substantially on a central portion of the block 48.

In an inoperative position of the system the valve (A) is closed, the valve (B) is open, no signals are sensed for transmission to the control module 15, and the piston 24 is held in a retracted position by the force in a compression return spring 54, with both chambers 31 and 32 being subjected to equal negative pressures through the external connection 40.

When the brake pedal is actuated, the input rod 44 and the lever 46 move to operate the dual switch 47 which sends signals to the control module 15 to close the valve (B) and isolate the chamber 31 from the servo chamber 32, and to open the valve (A) to admit atmosphere into the servo chamber 32. In consequence, the piston 24 moves to actuate the master cylinder 12 through the output rod 50, and hydraulic pressure is applied to the brakes 3,4,7 and 8. The input and output forces are sensed and compared with an electronic comparator, the reducing mechanism 48, and the switch 47. Thus, when this pressure, acting over the master cylinder area, produces a force on the output rod 50 which is in a correct proportion to the input force, the valve (A) closes. For example, if the booster is to have a nominal boost ratio of 4:1, the output force will be four times the input force before the valve (A) closes.

Should the driver's input force be reduced, the control module 15 ensures the closure of the valve (A) before the valve (B) is opened to reduce the servo assistance pressure until the output rod force is in the correct proportion to the reduced input force. When this ratio is correct, the valve (B) closes again.

The booster 2, therefore, normally behaves in a similar manner to a conventional mechanically-operated booster but with the valves operated by solenoids from signals from an electronic control module.

The advantage of the construction of the booster 2 is that the valves (A) and (B) can be operated independently of the pedal in response to signals from the electronic control module 15.

TRACTION CONTROL

In the event of a driven wheel, say the wheel 5, spinning, which prevents traction from being applied to the other driven, non-spinning, wheel 6 of that pair, such a condition is sensed by the sensor 11 and is recognised by the control module 15. In response to such a signal, the control module 15 is operative to close the valve (B) and open the valve (A) so that the piston 24 applies a force to the master cylinder 1 which enables the brake 3 to be applied. At the same time, the anti-lock modulators 7' and 8' isolate the non-driven wheels 9 and 10 from the master cylinder, and the modulator 4' either isolates the brake 4 from the master cylinder 1, or controls the pressure level in the brake 4 in the event of the wheel 6 tending to spin after the wheel 5 has been corrected.

AUTOMATIC CONTROL

When the driven vehicle is equipped with radar to sense the proximity of another vehicle which may cause a collision, the booster 2 can be used progressively to apply the brake pressure automatically to retard the vehicle at the correct level commensurate with the comparative speeds of the two vehicles and the distance between them.

In such a case, the control module 15, in response to signals from the radar (R), closes the valve (B) and cycles the valve (A) until the vehicle deceleration is sufficient to prevent an accident. If the offending vehicle moves away, the valve (A) is closed and the valve (B) is cycled, or opened, to reduce, or release, the brake pressure. Of course, if the driver applies the brakes in the normal way, the automatic system will not be evoked.

HOLDING ON A HILL

When the vehicle comes to a halt upon an upward sloping hill and the clutch is depressed, the control module 15, in response to signals from the hill holder (H), will automatically apply the brakes by closing the valve (B) and opening the valve (A). The driver can now take his right foot off the brake pedal and move it to the accelerator in readiness to pull away. To move off, the driver presses upon the accelerator and eases in the clutch to engage engine drive. In doing so, the control module 15 releases the brakes by closing the valve (A) and opening the valve (B).

If sufficient braking force can be provided from one set of axle brakes, i.e. front or rear, the anti-lock modulator 10 will isolate that one set of brakes.

AUTOMATIC LIMITING OF SERVO ASSISTANCE

When the brakes are applied on a slippery surface, the level of brake pressure is automatically controlled by the modulator assembly 10 in response to signals from the control module 15, irrespective of how hard the driver is pressing upon the brake pedal. For example, if the driver, with assistance of the booster 2, generates a pressure of 100 bar within the master cylinder 1 but the brake pressure is controlled to 20 bar by the anti-lock modulator assembly 10, then the driver and the booster 2 are generating far too much pressure for the road surface conditions and the servo chamber 32 is fully pressurised with atmosphere. Furthermore the pump and motor 16 may be under undue strain. This occurs particularly in systems in which a pump is adapted to pump fluid back to a master cylinder 1.

To overcome this adverse situation, the control module 15 will put the booster into a 'hold' position which both valves (A) and (B) are closed whenever all four wheels are being controlled by the anti-lock modulator assembly 10. Thus for the example above and assuming a 4:1 servo boost ratio, the master cylinder pressure will be $$20 + \frac{100 - 20}{4} = 40 \text{ bar}$$

even though the driver is pressing with sufficient force on the brake pedal to generate 100 bar under normal conditions. This means that not only is the pressure opposing the pump reduced from 100 to 40 bar but also the servo chamber 32 is not fully pressurised. Vacuum energy is therefore conserved.

If the vehicle passes onto a surface of higher friction, the valve (A) opens to increase the servo boost and the applied pressure. Should the vehicle pass from high to low friction, no correction is made to the boost pressure because the energy to provide servo assistance has already been spent.

The servo assistance limiting feature will also give benefits during the re-application of pressure in an anti-lock mode. When pressure is re-admitted to the brakes 3,4,7, and 8 from the master cylinder 1, it is much easier to control a 40 bar input pressure for a 20 bar brake pressure than from a 100 bar pressure source. For higher skid pressures on better surfaces, a 60 bar average brake pressure will produce a master cylinder pressure of 70 bar, with servo assistance limited, instead of the 100 bar which can be applied conventionally.

The magnitude of servo assistance may also be limited as soon as the vehicle deceleration calculated from information supplied by wheel speed sensors 3,4,7 and 8 reaches a maximum. This will prevent over-pressurisation of the braking system of the vehicle. For the case of a laden vehicle, or for brake linings with low friction values, the level of assistance will increase proportionally. Means (L) to sense the laden condition of the vehicle sends signals to the control module 15, the control module 15 determining the level of level servo assistance required.

The operational functions of the booster 2 are illustrated in the following Truth Table I:

TABLE I

| VALVE | A | B |
|---|---|---|
| NORMAL | X | O |
| HOLD | X | X |
| INCREASE | O | X |
| DECREASE | X | O |
| TRACTION | O | X |

O = Valve Open
X = Valve Closed

Figure 2:
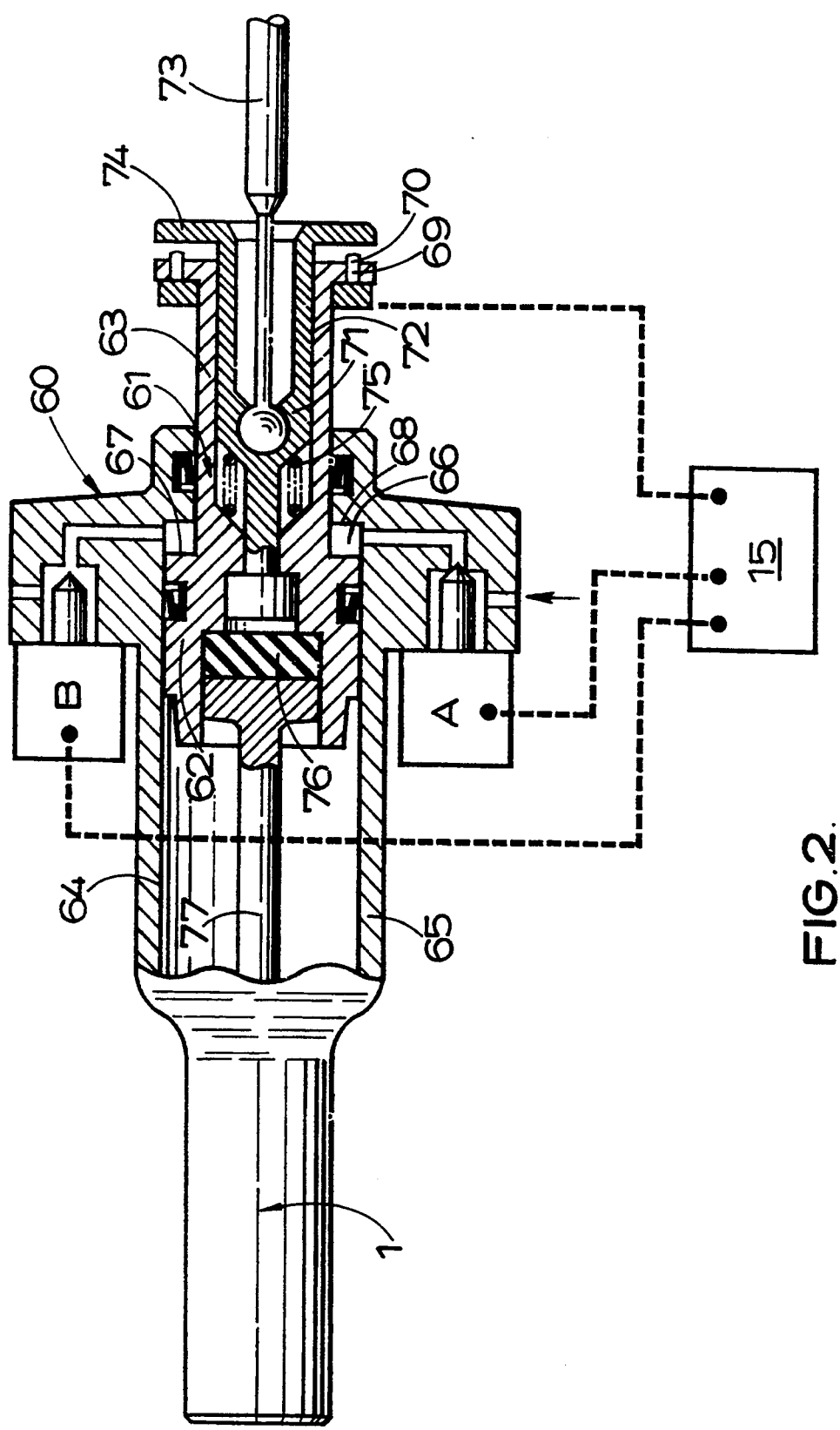
FIG. 2 is a layout similar to FIG. 1 but including a hydraulic booster.

In the braking system illustrated in the layout of FIG. 2 the vacuum-suspended booster 2 is replaced by an hydraulic booster 60.

As illustrated the booster 60 comprises a differential piston 61 having portions 62 and 63 of greater and smaller areas which work in corresponding portions of a stepped bore 64 in a housing 65 which is integral with the master cylinder 1. The portion of the bore which is of greater area is adjacent to the master cylinder 1.

A boost chamber 66 is defined in the bore 64 between a shoulder 67 on the piston 61 at the step in diameter, and a shoulder 68 at the step in diameter in the bore 64.

The free end of the piston portion 63 which projects from the housing 65 has a radial flange 69 which forms a mounting for an electric switch 70 from which signals are sent to the control module 15.

The solenoid-operated inlet valve (A) controls the admission into the boost chamber 66 of hydraulic fluid under pressure from an hydraulic accumulator (not shown), and the solenoid-operated valve (B) controls communication between the boost chamber 66 and a tank (not shown) for fluid.

Operation of the booster 60 is initiated by a pedal which acts on a piston 71 working in a bore 72 in the piston portion 63 through an input rod 73 to advance the piston 71 in the bore 72 against the load in a return spring 75. This causes a contact plate 74 at the outer end of the piston 71 to operate the switch 70. This movement of the piston 71 is also transmitted through a reducing mechanism in the form of a block 76 of resilient material to an output rod 77 which actuates the master cylinder 1.

In an inoperative position of the system the valve (A) is closed and the valve (B) is open so that the boost chamber 66 is unpressurised. The plate 74 is spaced from the switch 70 so that no signals are transmitted to the control module 15.

When the brake pedal is actuated, the input rod 73 moves to operate the switch 70. This sends signals to the control module 15 to close the valve (B) in order to isolate the boost chamber 66 from the tank and open the valve (A) to admit fluid under pressure into the boost chamber 66 from the accumulator. The boost piston 61 is then advanced in the bore 64 to operate the master cylinder 1 and apply the brakes on front and rear wheels of the vehicle in a similar manner to that of FIG. 1.

As in the construction of FIG. 1, the booster 60 responds to the actuation of a switch 70 which is operated by movement of the input rod 73, and uses a reaction block 76 to provide the driver with feedback at the pedal of the output force.

Since the construction and operation of the system of FIG. 2 is otherwise the same as that of FIG. 1 it will not be described further herein. Of course it is to be understood that the booster 60 is operable in response to signals from the control module 15 to perform all the functions described above with reference to FIG. 1, and as illustrated in the truth table I, as dictated by signals received by the control module 15 from wheel speed sensors, indicative of a wheel spin or an anti-lock condition, to achieve automatic control by radar, or to act as a hill holder.

Figure 3:
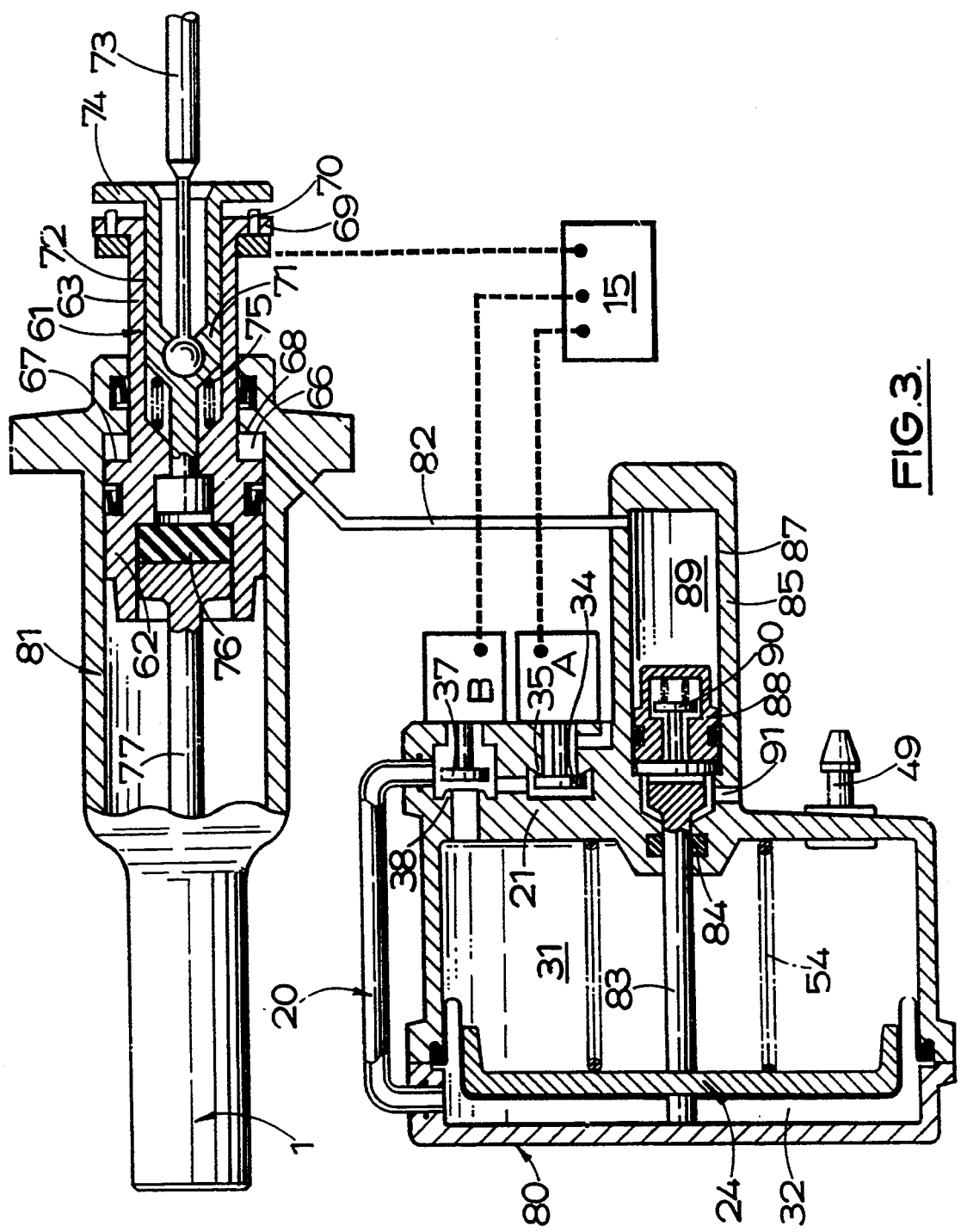
FIG. 3 is a layout of another hydraulic braking system in which a vacuum-suspended booster is remote from a pedal-operated hydraulic master cylinder.

In the layout illustrated in FIG. 3 of the accompanying drawings, a vacuum-suspended booster 80, similar in construction to the booster 2 of FIG. 1 is operated in conjunction with an hydraulic booster 81, similar in construction to the booster 60 of FIG. 2. The two boosters 80 and 81 constitute a single assembly.

As illustrated the solenoid-operated valves (A) and (B) are omitted from the booster 81, and the boost chamber 66 is connection with the booster 80 through an external connection.

The input rod 44, the piston 42, the lever 46, the switch 47, the reaction block 48, and the output rod 50 are replaced by a single output member 83 which is coupled to the piston 24 and extends through a seal 84 in the end wail 21 of the housing 20.

An auxiliary master cylinder 85 comprises a is housing 86 which is integral with the wall 21 and provided with a longitudinally extending bore 87. A piston 88 working in the bore 87 is adapted to be advanced in the bore 87 to pressurise fluid in a pressure space 89 in advance of the piston 88 and after initial movement of the piston 88 has caused the closure of a normally-open recuperation valve 90, whereby to isolate the space 89 from a reservoir for fluid through a reservoir connection 91. The pressure space 89 is connected to the boost chamber 66 through the external connection 82.

As before, the valves (A) and (B) are operated by the control module 15 to control operation of the booster 80 which, in turn, acts to pressurise the boost chamber 66 of the hydraulic booster 81.

In an inoperative position of the system the valve (A) is closed, the valve (B) is open, and the pistons 24 and 88 are in retracted positions with the recuperation valve 90 open.

When the brake pedal is actuated, the input rod 73 moves to operate the switch 70 which sends signals to the control module 15 to close the valve (B) and open the valve (A). The booster 80 then operates as described above with reference to FIG. 1 but with the piston 88 being advanced in the bore 87, initially to cause the recuperation valise 90 to close and thereafter to pressurise fluid in the pressure space 89, which fluid is transmitted through the connection 82, in turn to pressurise the boost chamber 66. The piston 62 acts to operate the master cylinder 1 in response to pressurisation of the boost chamber 66.

When the applied force and the servo forces balance the output force applied to the master cylinder 1, the valves (A) and (B) close to hold the pressure at that level.

The construction and operation of the system illustrated in the layout of FIG. 3 is otherwise the same as that of FIGS. 1 and 2, and corresponding references have been applied to corresponding parts.

The two boosters 80 and 81 are operable in conjunction with each other in response to signals from the control module 15 to perform all the functions described above with reference to FIGS. 1 and 2 and as illustrated in Truth Table I.

Since the two boosters 80 and 81 are remote from each other, the layout of FIG. 3 is particularly suited to vehicles where difficulty would otherwise be experienced in installing a booster/master cylinder assembly at a bulkhead.

Figure 4:
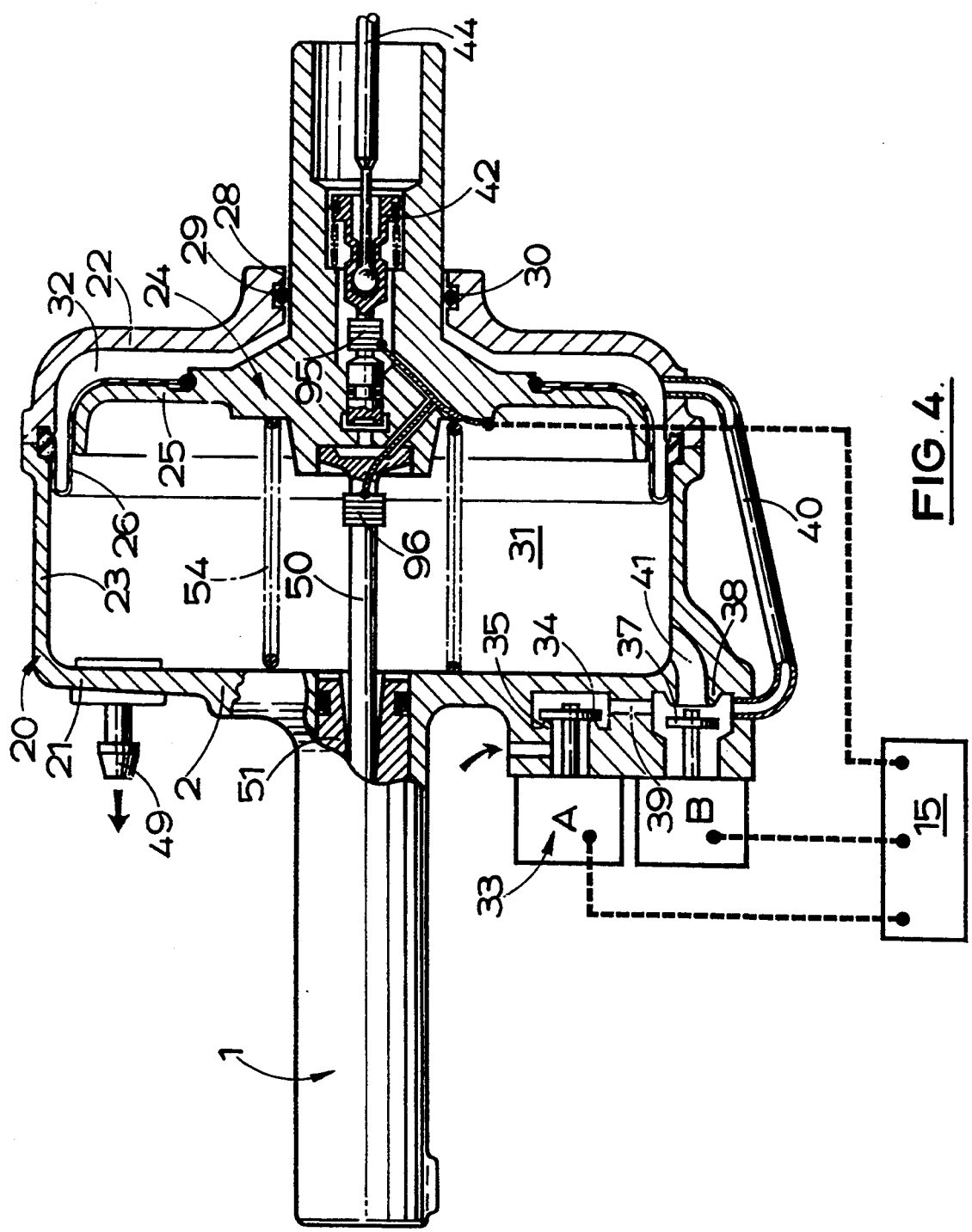
FIG. 4 is a layout similar to FIG. 1 but showing a modified booster.

In the braking system illustrated in the layout of FIG. 4 the booster is similar in construction to the booster 20 of FIG. 1. In this construction, however, the lever 46 and the dual valve 47 are omitted and the input piston 42 and the output rod 50 are each fitted with a respective load cell 95 and 96. The control module 15 is adapted to perform the task of comparing the two signals from the load cells 95 and 96 to determine the boost ratio.

This construction has a main advantage that we are able to modify the boost ratio to suit the various inputs. For example, an input signal of 200N may give a vehicle deceleration of 0.5 g for both 'driver only' and 'fully laden' conditions by changing to a higher boost ratio in the laden case.

The construction, operation and the functions of the system of FIG. 4 are otherwise the same as these of FIG. 1 and corresponding reference numerals have been applied to corresponding parts.

When a solenoid-operated valve (A) or (B) switches between an open position and a closed position, large quantities of fluid pressure pass through the respective valve at any one time with the result that the booster may be "over-energized". Should this occur there may be a tendency for the booster to overshoot and then "hunt" whilst trying to correct itself.

In the constructions described above, and particularly in the system illustrated in FIG. 4 of the drawings which embodies the load cells 95 and 96, the input load and the output load are measured when the output reaches substantially 75% of the input multiplied by the boost ratio. The solenoid of the inlet valve (A) is pulsed to reduce the rate of pressure rise within that cycle. This is arranged to occur for every switching, both for brake application and for brake release.

Figure 5:
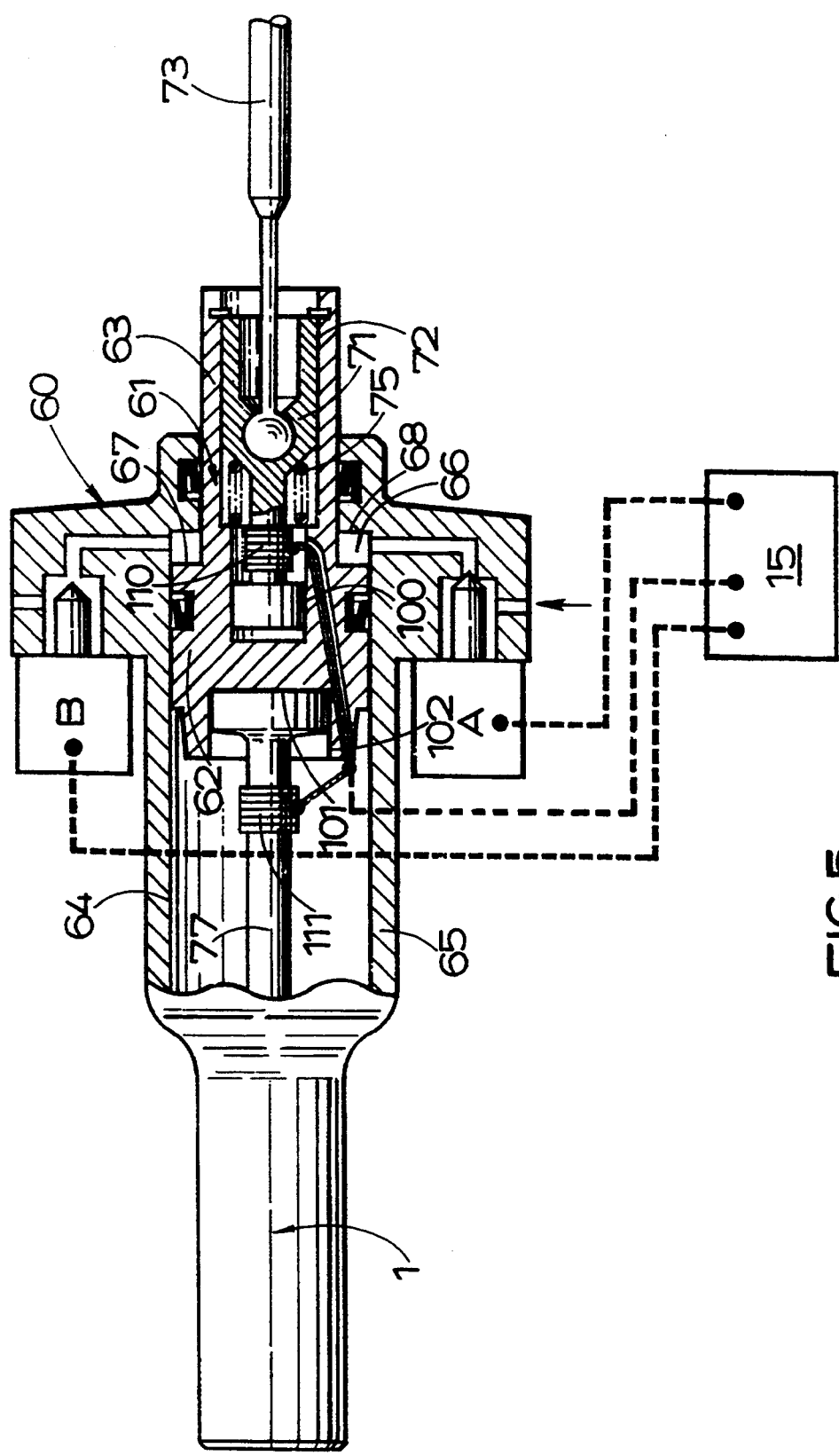
FIG. 5 is a layout similar to FIG. 2 but showing a modified booster.

In the braking system illustrated in FIG. 5 of the accompanying drawings the booster is similar to the booster 60 of FIG. 2 except that the piston 71 works in a blind bore 100 in the piston 61. The block 76 is omitted so that the output rod 77 co-operates with a face 101 at the inner end of a blind bore 102 co-axial with the bore 100. The radial flange 69, the switch 70, and the contact plate 74 are omitted.

In a similar manner to that of the booster of FIG. 4 the input piston 71 is provided with an input load cell 110, and the output rod 77 is provided with an output load cell 111. Again the signals from the two load cells 110 and 111 are compared by the control module to determine the boost ratio.

The construction and operation of the system of FIG. 5 is otherwise the same as that of FIG. 2 and corresponding reference numerals have been applied to corresponding parts.

In the braking systems described above difficulty may arise in controlling the first inlet valve (A) with sufficient precision for a smooth braking operation to be achieved for normal braking. For example, when considering the booster 2 of FIG. 4 of which the operation is controlled by the load cells 95 and 96, under varying high rates of pressure demand the response time may not be sufficiently rapid to control this rate of pressure increase accurately without the generation of noticeably large stepped increases in the output force from the booster. This, in turn, would cause an equivalent pattern of output pressure from the master cylinder with the result that the pressure applied to the brakes would increase in steps and an unacceptable jerky brake pressure application would result.

To avoid this situation, which occurs when the rate of demand reaches a critical level at which the booster performance is unacceptable as described above, the booster 2 is actuated to produce the large stepped increases expected at a high rate of demand, and the modulators 3',4', 7' and 8' are operated to achieve a smooth pressure increase at the respective brakes. When the operation of each modulator is controlled by a solenoid-operated valve, the solenoid-operated valves are pulsed by the control module 15 to achieve the desired pressure control.

The modulator pulse rate may be controlled in any convenient manner.

Figure 6:
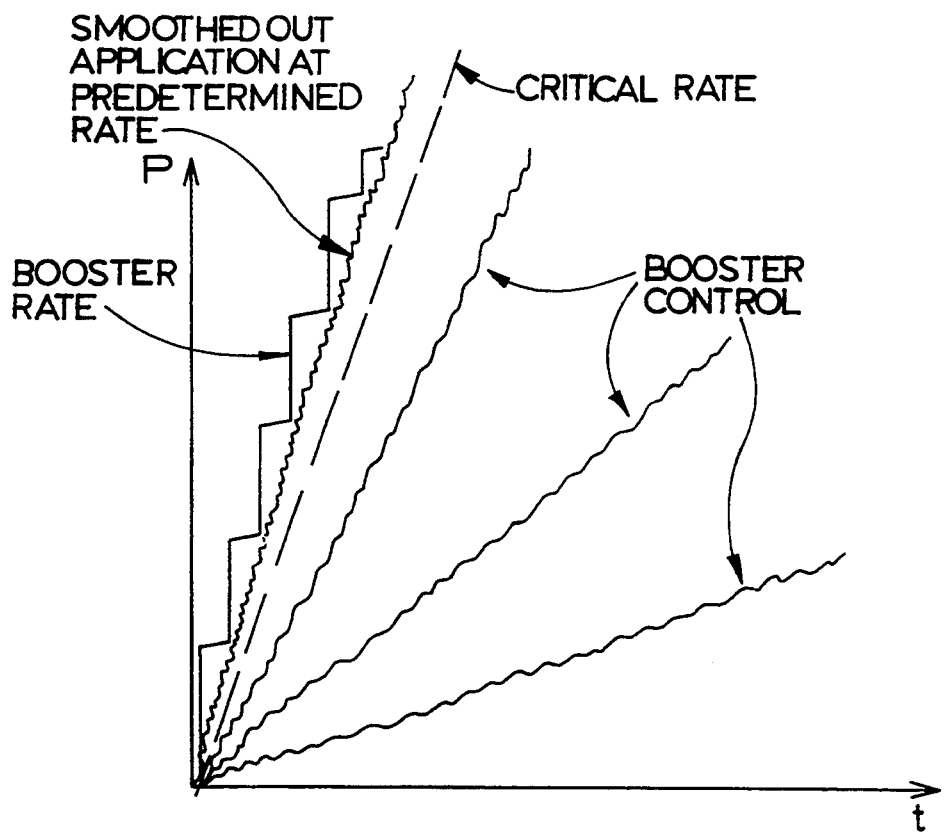
FIG. 6 is a graph showing modulator control of booster output for a given critical rate.

In one example illustrated in FIG. 6, in which pressure (P) is plotted against time (t), when a given, relatively high, rate of pressure demand is sensed by the control module 15 from signals emitted by the load cells 95 and 96, the booster 2 is actuated by the valves (A) and (B), and is then held by the control module 15 in an appropriate mode so that the master cylinder 1 produces a maximum pressure output for a given step. In such a mode the assembly constituted by the booster 2 and the master cylinder 1 acts as an accumulator, and the solenoid-operated valves of the modulators 3', 4', 7' and 8' are pulsed by the control module 15 at a predetermined rate so as to produce a known pressure increase in the brakes above the critical rate at which the booster performance is unacceptable. This pulse rate is pre-calculated and determined by experimentation.

Figure 7:
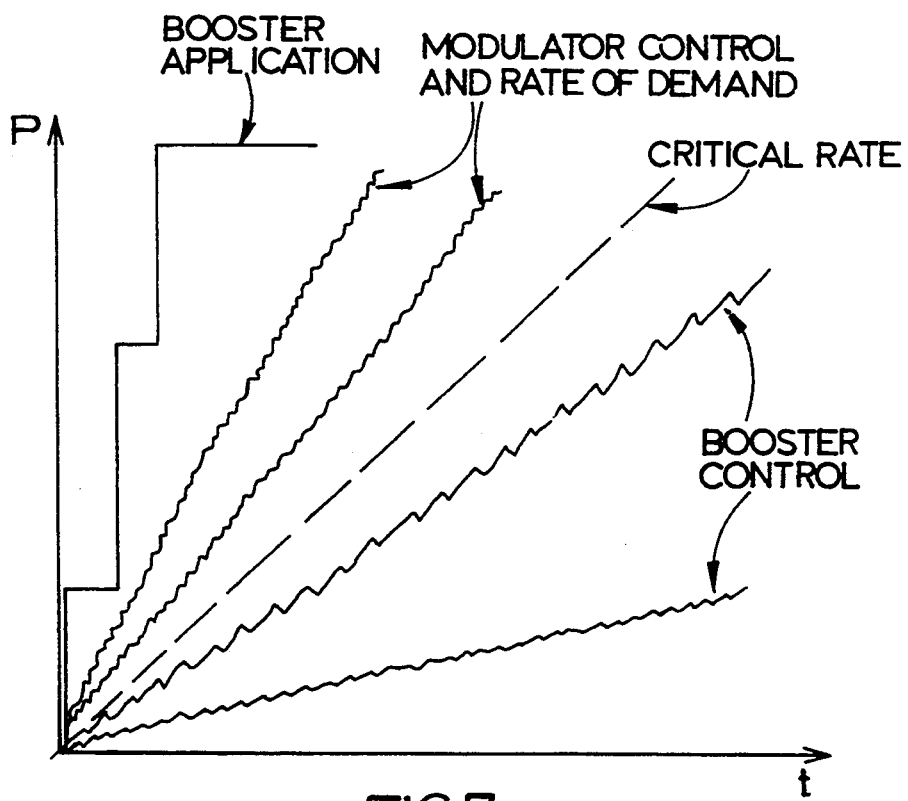
FIG. 7 is a graph similar to FIG. 6 but with different booster output characteristics and a different critical rate.

In another example, illustrated in FIG. 7, when the booster performance is unacceptable at a relatively low demand pressure and the modulators 2', 3' 7' and 8' are required to intervene and control the application of the brakes over a relatively wide range of demand pressures then, above the critical rate at which the booster performance is unacceptable, the pulse rate of the solenoid-operated valves of the modulators 2',3', 7' and 8' is varied in direct proportion to the rate of increasing demand as sensed by either the input load cell 95 or, alternatively, by a potentimeter or displacement transducer (not shown), conveniently attached to the brake pedal. In another arrangement the control module 15 itself senses that the critical rate is being approached with reference to the signals received from the wheel sensors 11, 12, 13, 14 when utilised in the traction control mode or the automatic control mode for collision avoidance.

The control module 15 is therefore adapted to control operation of the master cylinder 1 in steps above the critical rate so that the master cylinder 1 acts as an hydraulic accumulator of which the output pressure to the brakes is modulated by the respective modulator 2',3', 7' and 8' to smooth out the steps which otherwise, would have been applied to the brakes.

I claim:

1. A vehicle braking system comprising a brake on a wheel of a vehicle, a wheel speed sensor for sensing a behavior of said wheel and emitting a wheel speed signal for generating a hydraulic pressure, a hydraulic master cylinder for applying the brake, a booster for assisting operation of said master cylinder, an electronic controller receiving signals from said speed sensor, the electronic controller issuing an energizing current response to said signals, first and second solenoid operated valves, said first solenoid operated valve being movable between a first normally closed position and an open position, said second solenoid operated valve being between a first normally open position and a closed position, said first and second solenoid operated valves operating in response to said energizing current from said electronic controller to progressively control and monitor an energization of said booster in accordance with said energizing current, the sole means for energizing the booster being by operating said first and second solenoid operated valves between their respective open and closed positions, additionally comprising a member responsive to operation of a pedal, wherein said booster has an output rod and electrical means comprising a first load cell associated with said member, and a second load cell associated with said output rod, the electrical means being responsive to an operating force and emitting electrical signals to said electronic controllers, said electronic controller issuing said energizing current in response to said wheelspeed signal and said electrical signals.

2. A braking system according to claim 1, wherein said booster is adapted to be controlled by said electronic controller is response to a wheel anti-lock signal from said wheel speed sensor, whereby to reduce the level of hydraulic pressure applied to said brake.

3. A vehicle braking system according to claim 1, wherein said booster is adapted to modify its boost ratio to provide substantially the same vehicle deceleration for a given predetermined pedal effort irrespective of how laden said vehicle is.

4. A vehicle braking system according to claim 1, wherein said booster is adapted to be operated by said electronic controller to hold said vehicle on a hill or incline with a clutch pedal depressed.

5. A vehicle braking system comprising a brake on a wheel, a master cylinder for generating a hydraulic pressure for applying said brake, a fluid-pressure operated booster for operating said master cylinder, said booster comprising a piston and an output rod, the output rod being connected to the master cylinder for operating the master cylinders, said piston and said output rod causing signals to be generated indicative of input and output forces of said booster, a wheel speed sensor sensing a behavior of said wheel and emitting a wheel speed signal an electronic controller responsive to said wheel speed signal and said signals indicative of said input and output forces and adapted to emit output signals, and a modulator for providing modulation of a supply of fluid from said master cylinder to said brake in response to said output signals from said electronic controller, said modulator including first and second solenoid operated valves, said first solenoid operated valve being movable between a first normally closed position and an open position, said second solenoid operated valve being movable between a first normally open position and a closed position, said first and second solenoid operated valves operating, in response to said output signals from said electronic controller to progressively control and monitor said modulation of brake applying fluid in accordance with said output signals, the sole means for modulating the supply of fluid being by operating said first and second solenoid operated valves between their respective open and closed positions.

6. A braking system according to claim 5, wherein said booster is adapted to be controlled by said electronic controller is response to a wheel anti-lock signal from said wheel speed sensor, whereby to reduce the level of hydraulic pressure applied to said brake.

7. A vehicle braking system according to claim 5, wherein said booster is adapted to modify its boost ratio to provide substantially the same vehicle deceleration for a given predetermined pedal effort irrespective of how laden said vehicle is.

8. A vehicle braking system according to claim 5, wherein said booster is adapted to be operated by said electronic controller to hold said vehicle on a hill or incline with a clutch pedal depressed.

* * * * *